(12) United States Patent
Trumbower et al.

(10) Patent No.: US 12,480,600 B2
(45) Date of Patent: Nov. 25, 2025

(54) REFRIGERANT CONTROL VALVE WITH AN ENHANCED FLOW MODULATING PLUG CONFIGURATION

(71) Applicant: Parker-Hannifin Corporation, Cleveland, OH (US)

(72) Inventors: Michael W. Trumbower, Fort Wayne, IN (US); Gordon R. Coates, III, Augusta, MO (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 18/667,022

(22) Filed: May 17, 2024

(65) Prior Publication Data

US 2025/0075824 A1    Mar. 6, 2025

Related U.S. Application Data

(60) Provisional application No. 63/567,069, filed on Mar. 19, 2024, provisional application No. 63/600,235, filed on Nov. 17, 2023, provisional application No. 63/535,644, filed on Aug. 31, 2023.

(51) Int. Cl.
*F16K 39/02* (2006.01)
*F16K 1/36* (2006.01)
*F25B 41/20* (2021.01)

(52) U.S. Cl.
CPC ............... *F16K 39/02* (2013.01); *F16K 1/36* (2013.01); *F16K 2200/401* (2021.08); *F25B 41/20* (2021.01)

(58) Field of Classification Search
CPC .......... F16K 3/246; F16K 3/267; F16K 47/08; F16K 1/36; F16K 39/02; F16K 39/022; F16K 2200/401; F25B 41/20
See application file for complete search history.

(56) References Cited

U.S. PATENT DOCUMENTS

| | | | |
|---|---|---|---|
| 6,213,727 B1 | 4/2001 | Kawaguchi | |
| 6,782,713 B2 | 8/2004 | Takeuchi et al. | |
| 6,783,332 B2 | 8/2004 | Umemura et al. | |
| 2010/0051849 A1* | 3/2010 | Bohaychuk | F16K 47/08 251/324 |
| 2018/0010696 A1* | 1/2018 | Wang | F16K 47/08 |
| 2019/0024805 A1* | 1/2019 | Jackson | F16K 3/243 |

FOREIGN PATENT DOCUMENTS

| | | | | |
|---|---|---|---|---|
| CN | 102927336 A | * | 2/2013 | |
| CN | 202927178 U | * | 5/2013 | |
| CN | 104279343 A | * | 1/2015 | F16K 3/267 |
| CN | 115977568 A | | 4/2023 | |

(Continued)

*Primary Examiner* — Marina A Tietjen
(74) *Attorney, Agent, or Firm* — McDonnell Boehnen Hulbert & Berghoff LLP

(57) ABSTRACT

An example refrigerant control valve includes: a modulating plug that is linearly movable to control refrigerant flow rate from a first port to a second port; a first chamber formed at a first side of the modulating plug and fluidly coupled to the first port; a second chamber formed at a second side of the modulating plug, opposite the first side; a first flow restriction that fluidly couples the first chamber to the second chamber, and a second flow restriction that fluidly couples the second chamber to the second port.

20 Claims, 14 Drawing Sheets

(56) References Cited

FOREIGN PATENT DOCUMENTS

| | | | | |
|---|---|---|---|---|
| CN | 117432864 B | * | 2/2024 | ............. F16K 47/08 |
| CN | 117432813 B | * | 3/2024 | ............... F16K 1/04 |
| DE | 202023102559 U1 | * | 6/2023 | ............... F16K 1/36 |
| EP | 3376084 B1 | * | 2/2021 | ............... F16J 15/56 |
| EP | 3097329 B1 | * | 3/2021 | ............... F16K 1/36 |
| JP | 2008164239 A | | 7/2008 | |
| WO | WO-2024180409 A1 | * | 9/2024 | ............. G05D 7/014 |

* cited by examiner

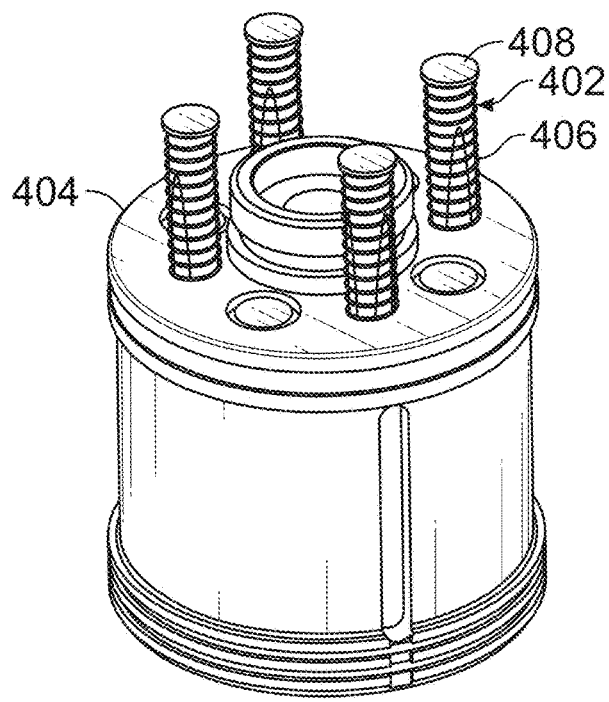
FIG. 11
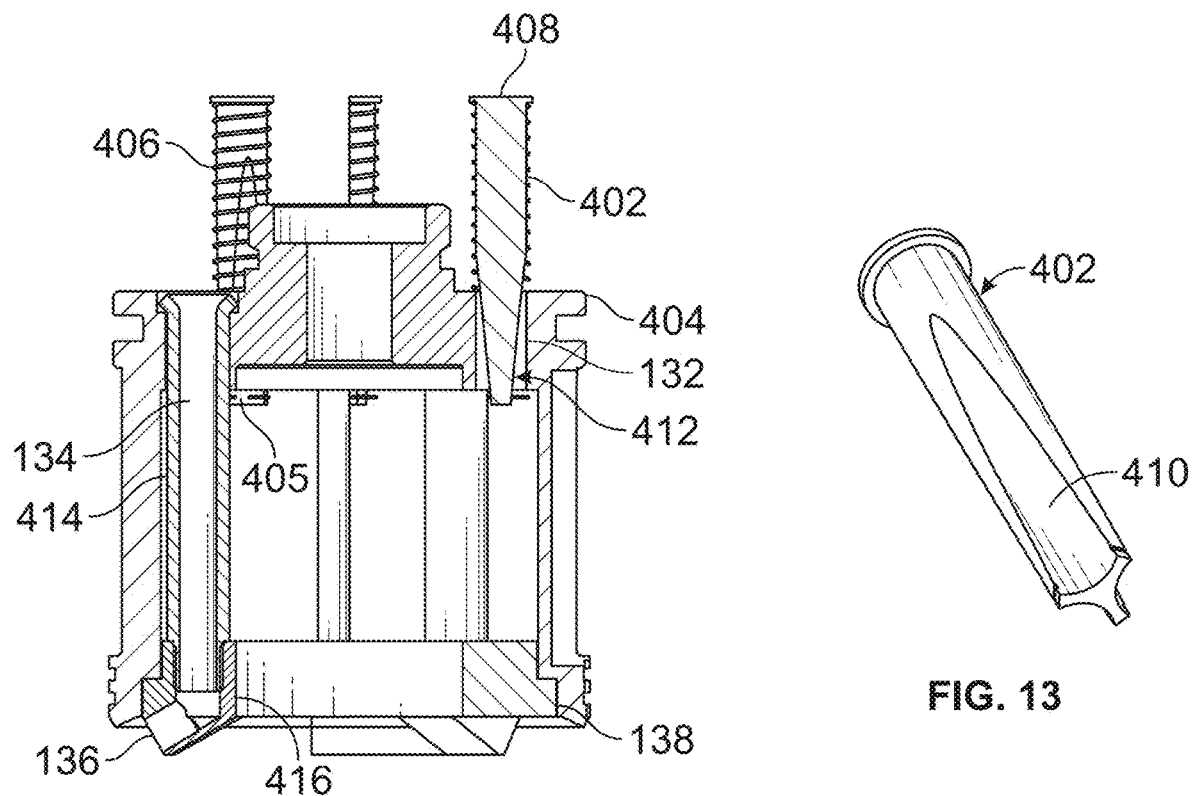
FIG. 12
FIG. 13

500

┌─────────────────────────────────────────────────────────────┐
│ RECEIVING FLUID AT A FIRST PORT OF A REFRIGERANT CONTROL    │
│ VALVE, WHEREIN THE REFRIGERANT CONTROL VALVE INCLUDES (I) A │
│ MODULATING PLUG THAT IS LINEARLY MOVABLE TO CONTROL         │
│ REFRIGERANT FLOW RATE FROM THE FIRST PORT TO A SECOND PORT, │ 502
│ (II) A FIRST CHAMBER FORMED AT A FIRST SIDE OF THE MODULATING│
│ PLUG AND FLUIDLY COUPLED TO THE FIRST PORT, AND (III) A SECOND│
│ CHAMBER FORMED AT A SECOND SIDE OF THE MODULATING PLUG,     │
│ OPPOSITE THE FIRST SIDE                                     │
└─────────────────────────────────────────────────────────────┘
                              ↓
┌─────────────────────────────────────────────────────────────┐
│ FLOWING FLUID FROM THE FIRST CHAMBER THROUGH A FIRST FLOW   │
│ RESTRICTION TO THE SECOND CHAMBER, THEREBY CAUSING          │ 504
│ PRESSURE LEVEL IN THE SECOND CHAMBER TO BE LOWER THAN       │
│ PRESSURE LEVEL IN THE FIRST CHAMBER                         │
└─────────────────────────────────────────────────────────────┘
                              ↓
┌─────────────────────────────────────────────────────────────┐
│ FLOWING FLUID FROM THE SECOND CHAMBER THROUGH A SECOND      │
│ FLOW RESTRICTION TO THE SECOND PORT, THEREBY CAUSING THE    │ 506
│ PRESSURE LEVEL IN THE SECOND CHAMBER TO BE HIGHER THAN      │
│ PRESSURE LEVEL AT THE SECOND PORT                           │
└─────────────────────────────────────────────────────────────┘
                              ↓
┌─────────────────────────────────────────────────────────────┐
│ APPLYING A NET FLUID FORCE TO THE MODULATING PLUG RESULTING │
│ FROM PRESSURE APPLIED BY REFRIGERANT IN THE FIRST CHAMBER   │
│ AND REFRIGERANT IN THE SECOND CHAMBER, WHEREIN THE          │ 508
│ PRESSURE LEVEL IN THE SECOND CHAMBER AND THE NET FLUID      │
│ FORCE ARE BASED ON RESPECTIVE SIZES OF THE FIRST FLOW       │
│ RESTRICTION AND THE SECOND FLOW RESTRICTION                 │
└─────────────────────────────────────────────────────────────┘

FIG. 16

REFRIGERANT CONTROL VALVE WITH AN ENHANCED FLOW MODULATING PLUG CONFIGURATION

CROSS REFERENCE TO RELATED APPLICATION

The present application claims priority to (i) U.S. Provisional Application No. 63/535,644 filed on Aug. 31, 2023, (ii) U.S. Provisional Application No. 63/600,235 filed on Nov. 17, 2023, and (iii) U.S. Provisional Application No. 63/567,069 filed on Mar. 19, 2024, the entire contents of all of which are herein incorporated by reference as if fully set forth in this description.

BACKGROUND

Refrigerant control valves are used in industrial refrigeration systems to control flow of refrigerants such as ammonia and CO2. These valves can be used in a number of applications involving a large, industrial refrigeration system for controlling feed of liquid refrigerant to a low pressure receiver, maintaining a desired evaporator pressure, or controlling the hot gas pressure during a defrost cycle, as examples.

Refrigerant control valves can be electronically-controlled. For instance, such electronically-controlled refrigerant control valves can modulate (e.g., regulate, control, or influence) the flow of refrigerant using an electronic stepper motor, which is rotated and positioned based on an analog, proportional control signal. Control valves with an electronic stepper motor can have a linearly-movable modulating plug, where a position of the modulating plug is controlled by the stepper motor, and the position of the modulating plug controls fluid flow rate through the valve. Performance of such valves may be limited by the actuator motor strength and the net refrigerant force induced on the plug by the operating pressure differential across the valve and associated flow dynamics.

It may thus be desirable to configure a refrigerant control valve in a manner that limits the net refrigerant force acting on the modulating plug to enhance performance of the valve without using a larger/stronger actuator. It is with respect to these and other considerations that the disclosure made herein is presented.

SUMMARY

The present disclosure describes implementations that relate to a refrigerant control valve with an enhanced flow modulating plug configuration.

In a first example implementation, the present disclosure describes a refrigerant control valve including: a modulating plug that is linearly movable to control refrigerant flow rate from a first port to a second port; a first chamber formed at a first side of the modulating plug, wherein the first chamber is fluidly coupled to the first port; a second chamber formed at a second side of the modulating plug, opposite the first side; a first flow restriction that fluidly couples the first chamber to the second chamber; and a second flow restriction that fluidly couples the second chamber to the second port.

Refrigerant received at the first port flows to the first chamber, then through the first flow restriction to the second chamber, then through the second flow restriction to the second port, thereby creating an intermediate pressure level in the second chamber, which is lower than inlet pressure level at the first port and higher than outlet pressure level at the second port. With this configuration, a net fluid force is applied to the modulating plug due to pressure applied by refrigerant in the first chamber and refrigerant in the second chamber, wherein the intermediate pressure level and the net fluid force are based on respective sizes of the first flow restriction and the second flow restriction.

In a second example implementation, the present disclosure describes a method of operating the refrigerant control valve of the first example implementation.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 11 illustrates a perspective view of a modulating plug and spring-loaded pins of the refrigerant control valve of FIGS. 9-10, according to an example implementation.

FIG. 12 illustrates a cross-sectional elevational view of the modulating plug and the spring-loaded pins of FIG. 11, according to an example implementation.

FIG. 13 illustrates a perspective view of a spring-loaded pin, according to an example implementation.

FIG. 16 is a flowchart of operating a refrigerant control valve, according to an example implementation.

DETAILED DESCRIPTION

Within examples, disclosed herein are refrigerant control valves and method associated with limiting the net refrigerant force acting on a modulating plug to enhance performance of the refrigerant control valves.

Figure 1:
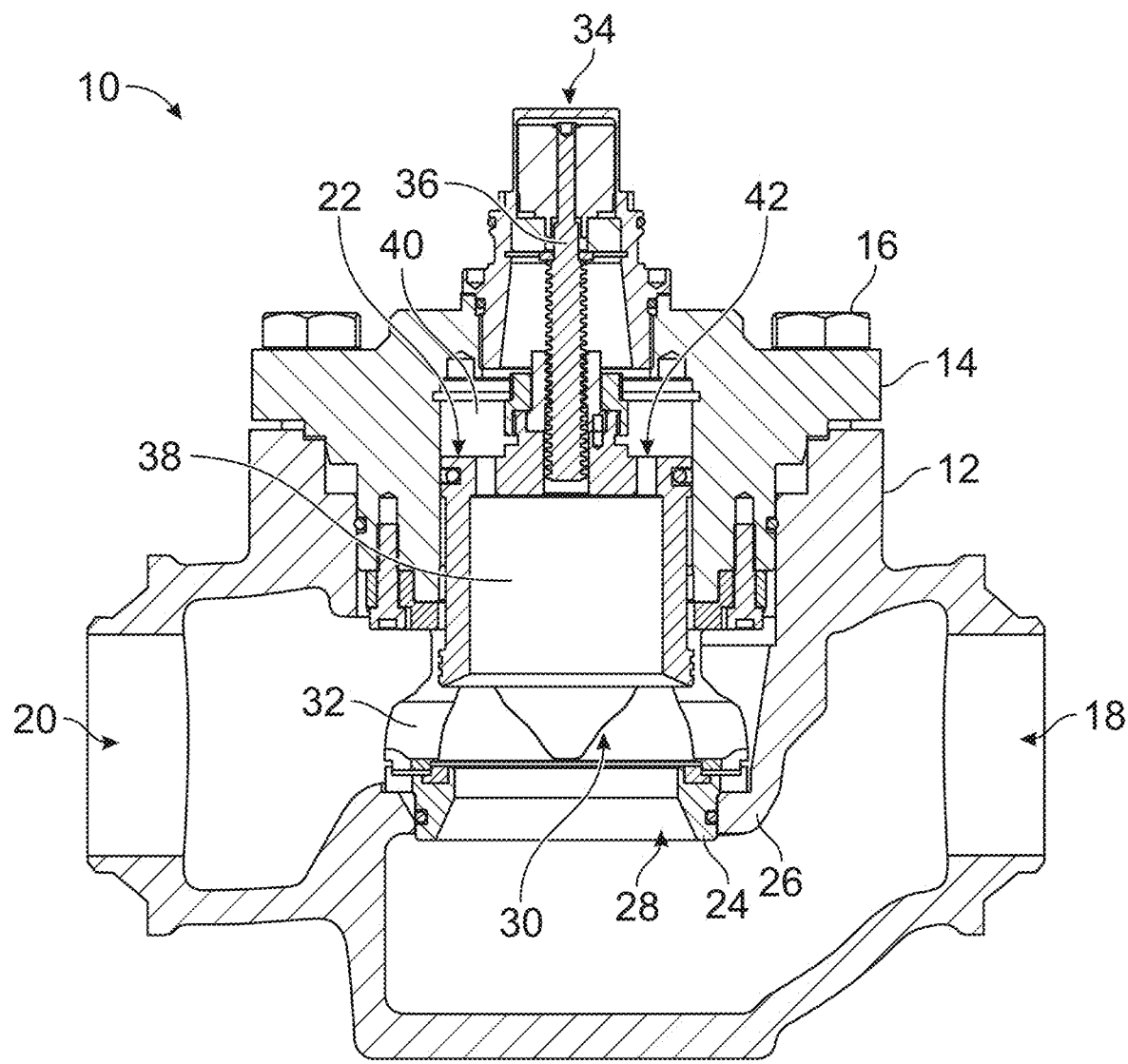
FIG. 1 illustrates a cross-sectional elevational view of a refrigerant control valve, according to an example implementation.

FIG. 1 illustrates a cross-sectional elevational view of a refrigerant control valve 10, according to an example. The refrigerant control valve 10 has a valve body 12 and a plate 14 that is coupled to the valve body 12 via screws such as screw 16.

The valve body 12 defines or includes a first port 18 (e.g., an inlet port) and a second port 20 (e.g., an outlet port). The plate 14 has a cavity in which a modulating plug 22 is disposed and is linearly/vertically movable therein. The refrigerant control valve 10 also includes a seat 24 that is affixed to an internal web 26 formed in the valve body 12 as depicted in FIG. 1.

The seat 24 is hollow and annular in shape, and has an opening 28 to allow refrigerant flow from the first port 18 to a main chamber 30 of the refrigerant control valve 10. The refrigerant control valve 10 also has one or more flow openings (e.g., cross-holes) such as flow opening 32 that allow refrigerant flow from the main chamber 30 to the second port 20.

The linear or vertical position of the modulating plug 22 determines the flow area between the main chamber 30 and the flow opening 32. If the modulating plug 22 moves downward, the flow opening 32 is restricted to reduce the refrigerant flow rate. If the modulating plug 22 moves all the way downward such that it is seated against or on the seat 24, the flow opening 32 is blocked to prevent refrigerant flow. Conversely, if the modulating plug 22 moves upward, the flow opening 32 becomes less restricted to increase the refrigerant flow rate.

The refrigerant control valve 10 includes an actuator 34, such as a stepper motor, that controls the linear position of the modulating plug 22 via a screw 36, for example. For instance, the modulating plug 22 can be threadedly engaged with the screw 36 such that as the actuator 34 rotates the screw 36 in a first rotational direction, the modulating plug 22 moves in a first linear direction (e.g., downward). When the actuator 34 rotates the screw 36 in a second rotational direction, the modulating plug 22 moves in a second linear direction (e.g., upward).

As depicted, the modulating plug 22 is hollow such that a first chamber 38 (e.g., a bottom chamber) is formed at a first side (e.g., bottom side) of the modulating plug 22. A second chamber 40 is formed at a second side (e.g., top side) of the modulating plug 22 between the modulating plug 22 and interior surfaces of the plate 14. Refrigerant in the first chamber 38 applies a fluid force on the modulating plug 22 in the upward direction, while refrigerant in the second chamber 40 applies a respective fluid force on the modulating plug 22 in the downward direction.

The modulating plug 22 further includes vent holes, such as vent hole 42, that can be formed in a circular array in the modulating plug 22. The vent hole 42 fluidly couples the first chamber 38 to the second chamber 40. Particularly, refrigerant received through the first port 18 flows through the main chamber 30 to the first chamber 38, then through the vent hole 42 to the second chamber 40.

As such, the vent hole 42 is used to limit the net refrigerant force acting on the modulating plug 22 by balancing pressure of the refrigerant communicated to the second chamber 40 acting on the top of the modulating plug 22 and the refrigerant communicated to the first chamber 38 acting on the bottom of the modulating plug 22.

The first chamber 38 receives refrigerant that has a pressure level substantially equal to pressure level of the inlet refrigerant received at the first port 18. The vent hole 42 of the modulating plug 22 allows pressure to be communicated to the second chamber 40 and applied across the top of the modulating plug 22.

However, pressure level in the second chamber 40 on the top of the modulating plug 22 is static, while the pressure level of refrigerant in the first chamber 38 acting on the bottom of the modulating plug 22 can vary based on position of the modulating plug 22, which determines size of the flow openings 32. With larger size valves and modulating plugs, the pressure differential between pressure level of refrigerant acting on a top surface of the modulating plug 22 and a respective pressure level of refrigerant acting on a bottom surface of the modulating plug 22 causes a large net force to act on the modulating plug 22. This large net force can exceed the actuator force capability, thus limiting performance of the refrigerant control valve 10.

One solution is have a stronger actuator 34 (e.g., stronger stepper motor). However, such stronger actuator increases the cost of the refrigerant control valve 10. In another example, the Maximum Operating Pressure Differential (MOPD) performance rating of the refrigerant control valve 10 is decreased, thereby limiting the applications where the refrigerant control valve 10 can be used.

Thus, it may be desirable to configure a refrigerant control valve in a manner that limits the net refrigerant force acting on the modulating plug to enhance performance of the valve without using a larger/stronger actuator or reducing the MOPD performance rating of the valve.

Figure 2A:
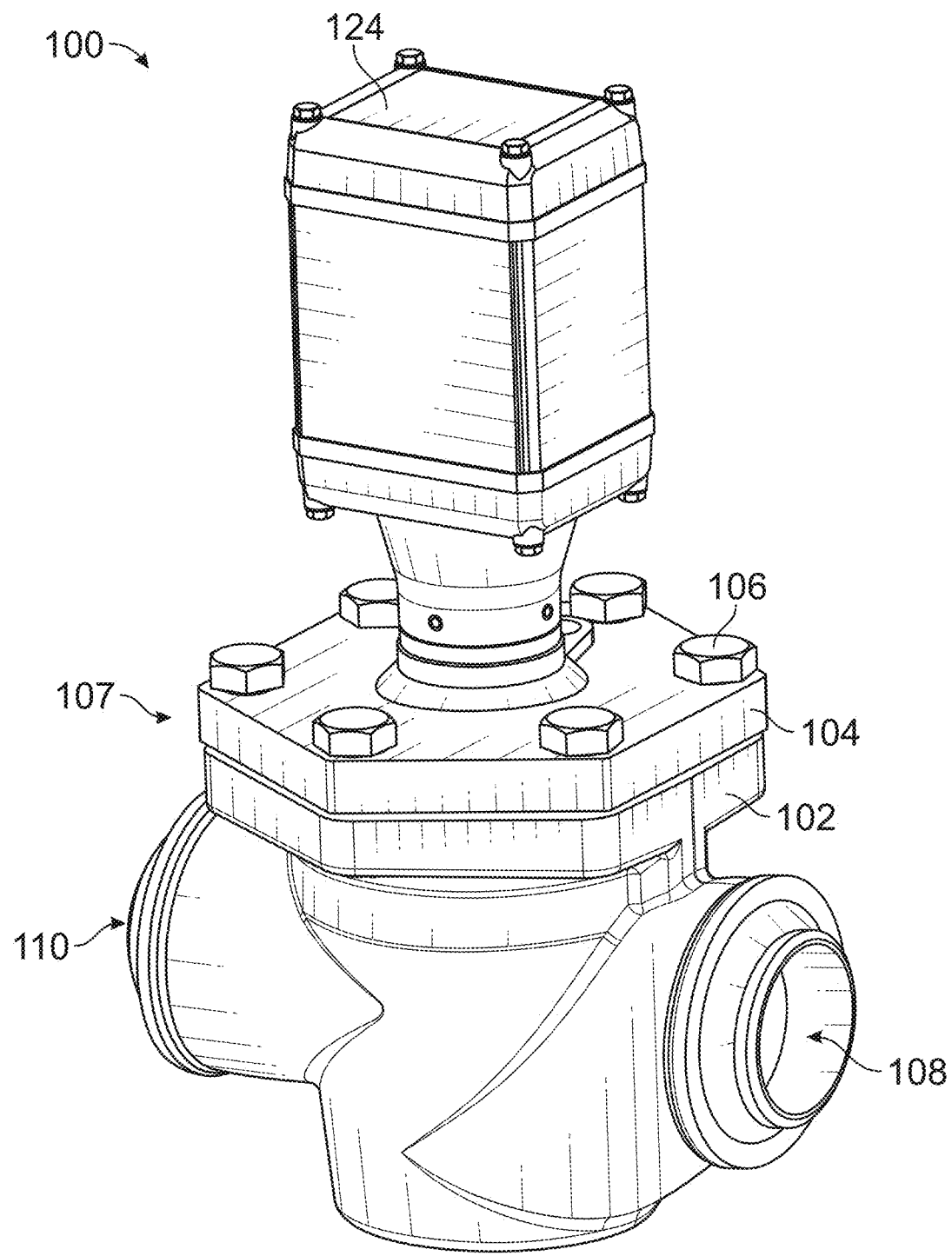
FIG. 2A illustrates a perspective view of a refrigerant control valve, according to an example implementation.
Figure 2B:
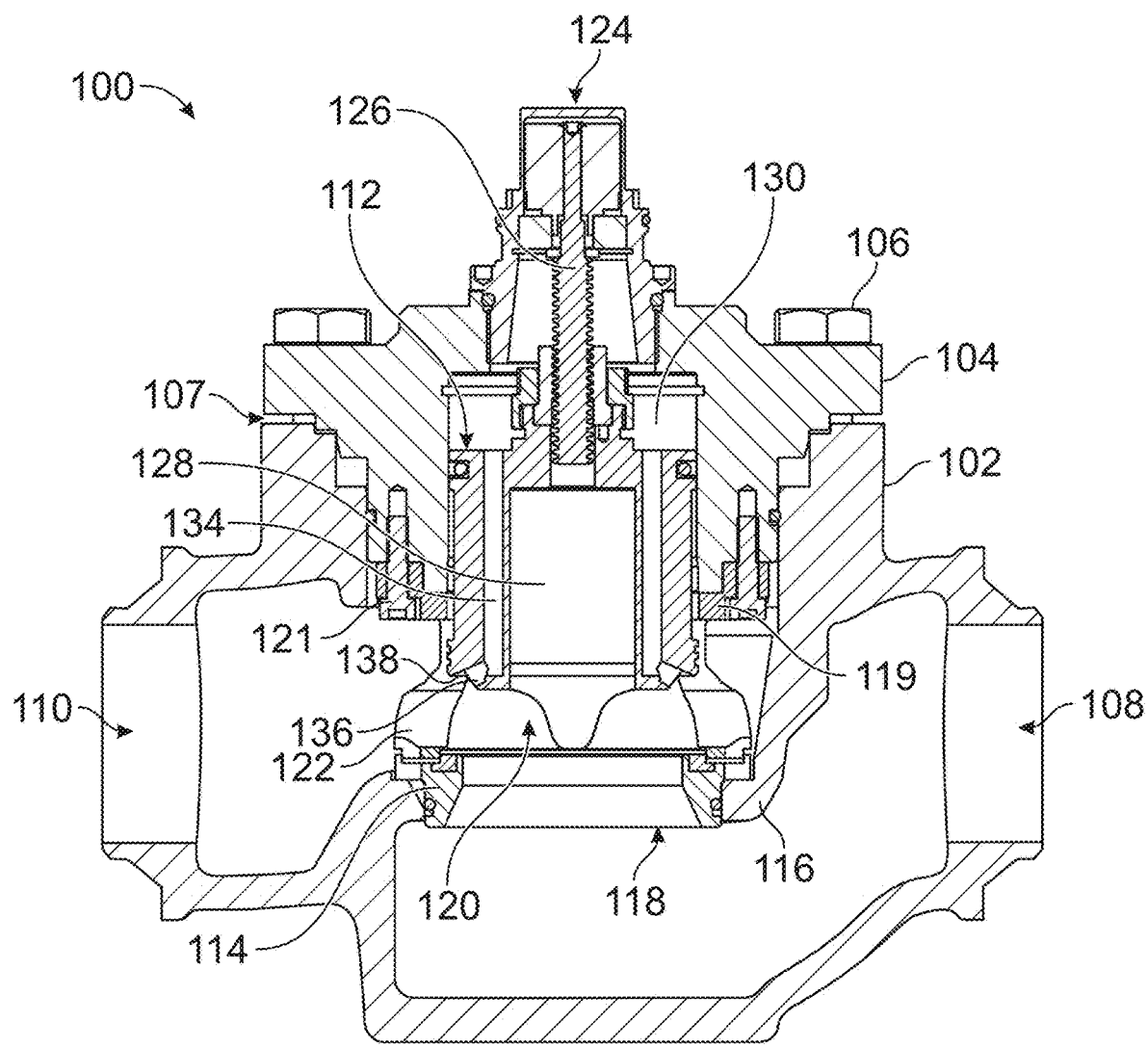
FIG. 2B illustrates a cross-sectional elevational view of the refrigerant control valve of FIG. 2A, according to an example implementation.

FIG. 2A illustrates a perspective view of a refrigerant control valve 100, and FIG. 2B illustrates a cross-sectional elevational view of the refrigerant control valve 100, according to an example implementation. The refrigerant control valve 100 has a valve body 102 and a plate 104 that is coupled to the valve body 102 via screws such as screw 106. The valve body 102 and the plate 104 together form a housing 107 of the refrigerant control valve 100.

The valve body 102 of the housing 107 defines or includes a first port 108 (e.g., an inlet port) and a second port 110 (e.g., an outlet port). The plate 104 of the housing 107 has a cavity in which a modulating plug 112 is disposed and is linearly/vertically movable therein. The modulating plug 112 can be referred to as a flow modulating plug, piston, or poppet as it regulates or controls fluid flow through the refrigerant control valve 100. The terms "fluid" and "refrigerant" are used interchangeably throughout this disclosure. Also, the term "fluid" encompasses gases or liquids.

The refrigerant control valve 100 also includes a seat 114 that is affixed to an internal web 116 formed in the valve body 102 as depicted in FIG. 2B. The seat 114 is annular in shape and has an opening 118 to allow refrigerant flow from the first port 108 to a main chamber 120 of the refrigerant control valve 100.

The refrigerant control valve 100 further includes an inner housing 119 disposed within the valve body 102 and coupled to the plate 104 via screws such as screw 121. The inner housing 119 along with the plate 104 define a longitudinal cavity in which the modulating plug 112 is movable. The inner housing 119 also has one or more flow openings (e.g., cross-holes) such as flow opening 122 that allow refrigerant flow from the main chamber 120 to the second port 110.

The linear or vertical position of the modulating plug 112 determines the flow area between the main chamber 120 and the flow opening 122. If the modulating plug 112 moves downward, the flow opening 122 is restricted to reduce the refrigerant flow rate. If the modulating plug 112 moves all the way downward such that it is seated against or on the seat 114, the flow opening 122 is blocked to prevent refrigerant flow. Conversely, if the modulating plug 112 moves upward, the flow opening 122 becomes less restricted to increase the refrigerant flow rate.

The refrigerant control valve 100 includes an actuator 124 such as a stepper motor that controls the linear position of the modulating plug 112 via a screw 126, for example. For instance, the modulating plug 112 can be threadedly engaged with the screw 126 such that as the actuator 124 rotates the screw 126 in a first rotational direction, the modulating plug 112 moves in a first linear direction (e.g., downward). When the actuator 124 rotates the screw 126 in a second rotational direction, the modulating plug 112 moves in a second linear direction (e.g., upward).

As depicted, the modulating plug 112 is hollow such that a first chamber 128 (e.g., a bottom chamber) is formed at a first side (e.g., bottom side) of the modulating plug 112. A second chamber 130 is formed at a second side (e.g., top side, opposite the first side) of the modulating plug 112 between the modulating plug 112 and interior surfaces of the plate 104.

Refrigerant in the first chamber 128 applies a fluid force on the modulating plug 112 in an upward direction, while refrigerant in the second chamber 130 applies a respective fluid force on the modulating plug 112 in a downward direction. As such, a net fluid/refrigerant force is applied on the modulating plug 112. The refrigerant control valve 100 is configured to control the pressure level of refrigerant in the second chamber 130 to reduce or minimize the net refrigerant force acting on the modulating plug 112.

Figure 3:
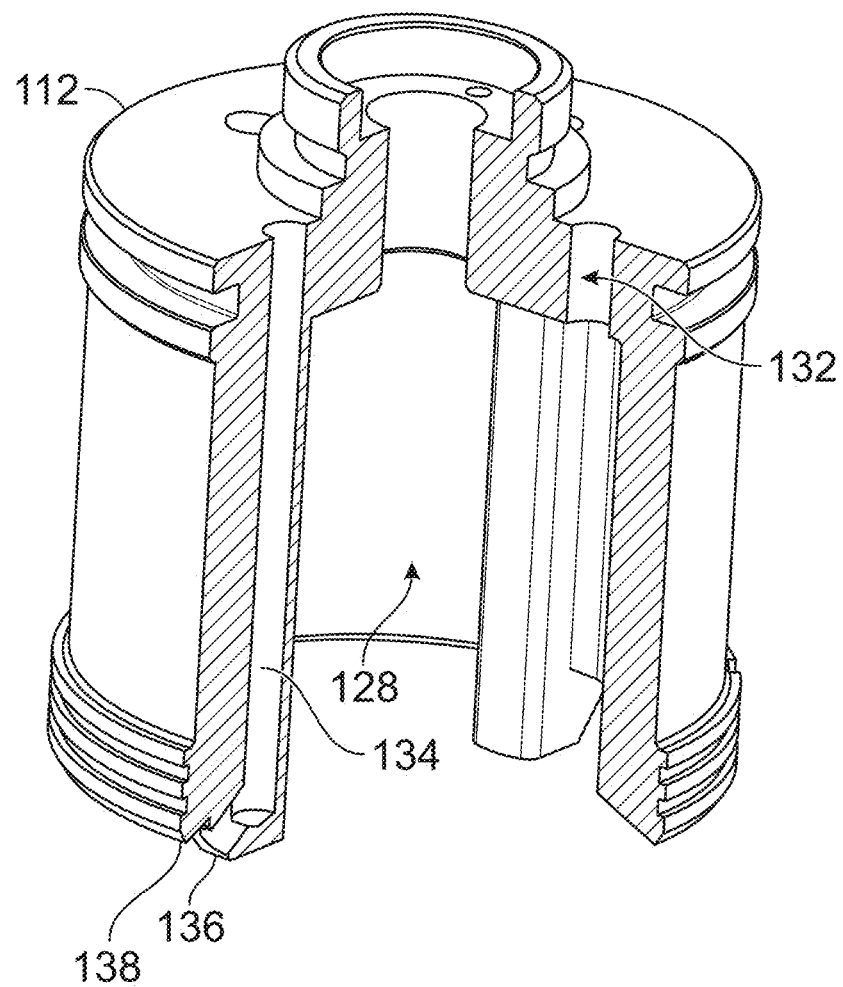
FIG. 3 illustrates a perspective partial cross-sectional view of a modulating plug, according to an example implementation.

FIG. 3 illustrates a perspective partial cross-sectional view of the modulating plug 112, according to an example implementation. Referring to FIGS. 2-3 together, the modulating plug 112 can have a plurality of vent holes, such as vent hole 132, that fluidly couple the first chamber 128 to the second chamber 130. The term "fluidly couple" is used throughout herein to indicate that fluid can flow or be communicated between two fluid passages, chambers, ports, or openings.

The plurality of vent holes can be formed in a circular array about the modulating plug 112, for example. The vent hole 132 is used herein to indicate a particular vent hole or to refer collectively to the plurality of vent holes formed in the modulating plug 112.

The modulating plug 112 also includes a plurality of vent channels such as vent channel 134. The plurality of vent channels can also be formed in a circular array about the modulating plug 112. The vent channel 134 is used herein to indicate a particular vent channel or to refer collectively to the plurality of vent channels formed in the modulating plug 112. As depicted in FIG. 3, the vent hole(s) 132 can be circularly interleaved with the vent channel(s) 134 (e.g., each vent hole 132 is circumferentially or circularly disposed between two vent channels 134 and vice versa).

The modulating plug 112 can further includes a plurality of orifices such as orifice 136 formed at a bottom of the modulating plug 112 adjacent a seating edge 138 configured to interface with the seat 114 when the modulating plug 112 is seated against the seat 114. As depicted in FIG. 2B, the orifice 136 fluidly couples the vent channel 134 to the flow opening 122. The orifice 136 is used herein to indicate a particular orifice or to refer collectively to the plurality of orifices formed in the modulating plug 112.

Refrigerant is received at the first port 108, then flows through the main chamber 120 and the flow opening 122 to the second port 110. As mentioned above, the modulating plug 112 restricts the flow opening 122, and thus a "pressure drop" occurs as refrigerant flows through the flow opening 122. As such, inlet pressure of the refrigerant upstream of the flow opening 122 at the first port 108, the main chamber 120, and the first chamber 128 is higher than pressure level downstream or around the flow opening 122 and the outlet (e.g., the second port 110) of the refrigerant control valve 100.

Due to such pressure differential, refrigerant is induced to flow from the first chamber 128 having the higher pressure level, through the vent hole(s) 132 (see FIG. 3), into the second chamber 130 above the modulating plug 112, then down the vent channel(s) 134, and out through the orifice(s) 136 toward the second port 110. Thus, a first flow restriction is formed through the modulating plug 112 from the first chamber 128 to the second chamber 130. The first flow restriction includes, for example, the vent hole(s) 132. Further, a second flow restriction is formed from the second chamber 130 to the second port 110. The second flow restriction includes, for example, the vent channel(s) 134 and/or the orifice(s) 136.

In the example implementation of FIG. 2B, 3, the first flow restriction and the second flow restriction are formed, at least partially in the modulating plug 112. Particularly, the vent hole(s) 132, which are at least a portion of the first flow restriction, are formed in the modulating plug 112. Similarly, the vent channel(s) 134 and the orifice(s) 136, which are at least a portion of the second first flow restriction, are formed in the modulating plug 112. However, in other examples, the first and second flow restrictions, or at least portions thereof, can be formed in other components. For example, the flow restrictions can be formed, at least partially in the valve body 102, the inner housing 119, or additional components coupled to the modulating plug 112, as examples (e.g., see manifold ring 416 described below with respect to FIG. 10 and including the orifice(s) 136).

The first flow restriction causes a pressure drop from the first chamber 128 to the second chamber 130. In other words, pressure level in the second chamber 130 becomes lower than the pressure level in the first chamber 128 due to refrigerant flow through the first flow restriction (e.g., the vent hole(s) 132). Also, the second flow restriction causes a respective pressure drop from the second chamber 130 to the second port 110. In other words, pressure level at the second port 110 becomes lower than the pressure level in the second chamber 130 due to refrigerant flow through the second flow restriction (e.g., the vent channel(s) 134 and/or the orifice(s) 136). Vent holes, channels, and orifices are used herein as examples. Any type of flow restrictions can be used to create such pressure drops.

As such, the first and second flow restrictions create an intermediate pressure level in the second chamber 130 above the modulating plug 112, where such intermediate pressure level is lower than the inlet pressure level at the first port 108, and higher than the outlet pressure level at the second port 110. By adjusting the flow restrictions (e.g., by adjusting the size of the vent hole(s) 132 and the orifice(s) 136), the intermediate pressure level of the refrigerant in the second chamber 130 acting on top of the modulating plug 112 can be adjusted to minimize the net fluid force acting on the modulating plug 112.

In examples, it may be desirable to dynamically change the size of the first flow restriction and/or the second flow restriction. For example, it may be desirable to dynamically change the size of the flow restriction through the vent holes. This way, control of pressure level of refrigerant in the second chamber 130 can further be enhanced.

Figure 4:
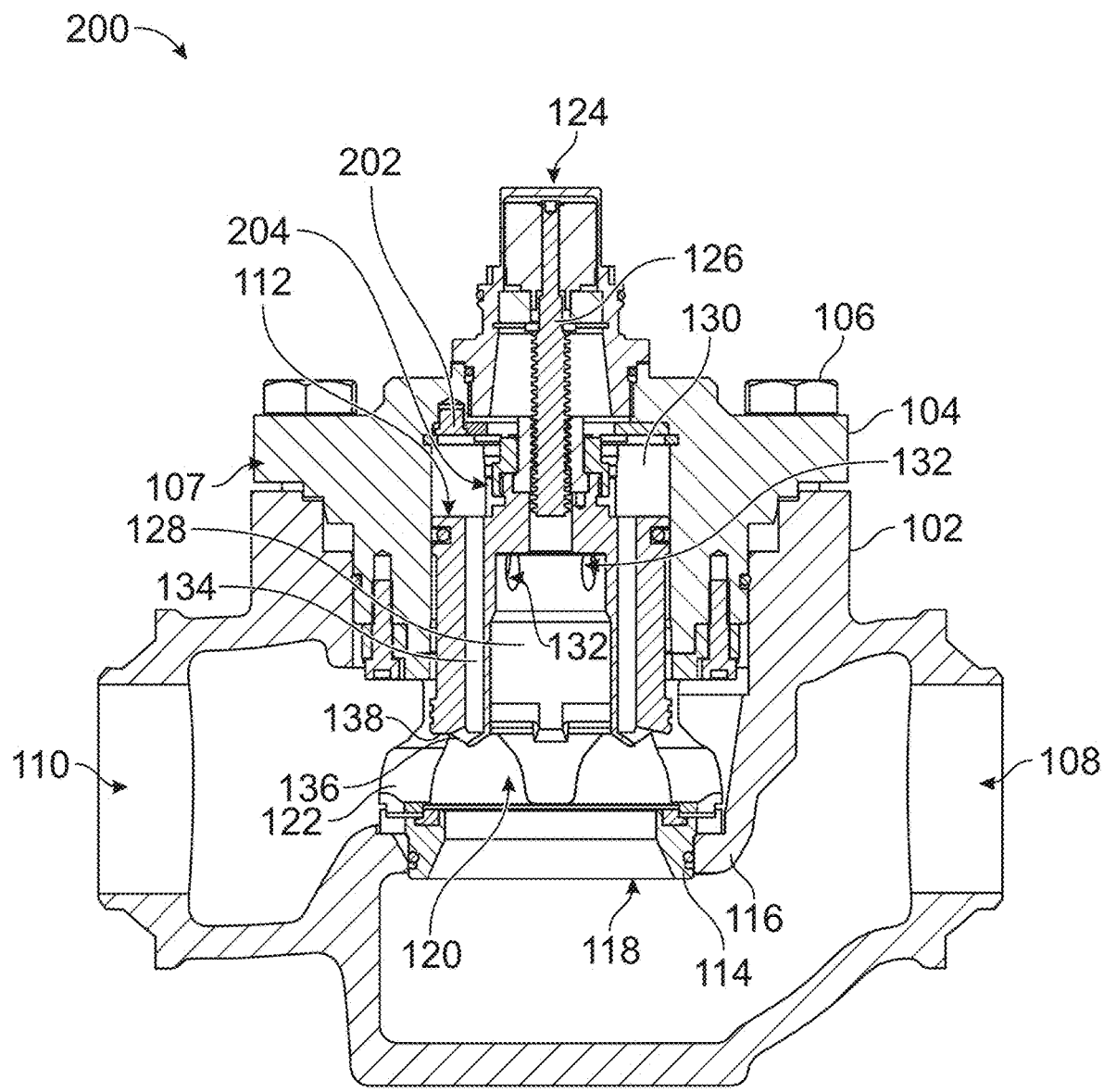
FIG. 4 illustrates a cross-sectional elevational view of a refrigerant control valve, according to an example implementation.
Figure 5:
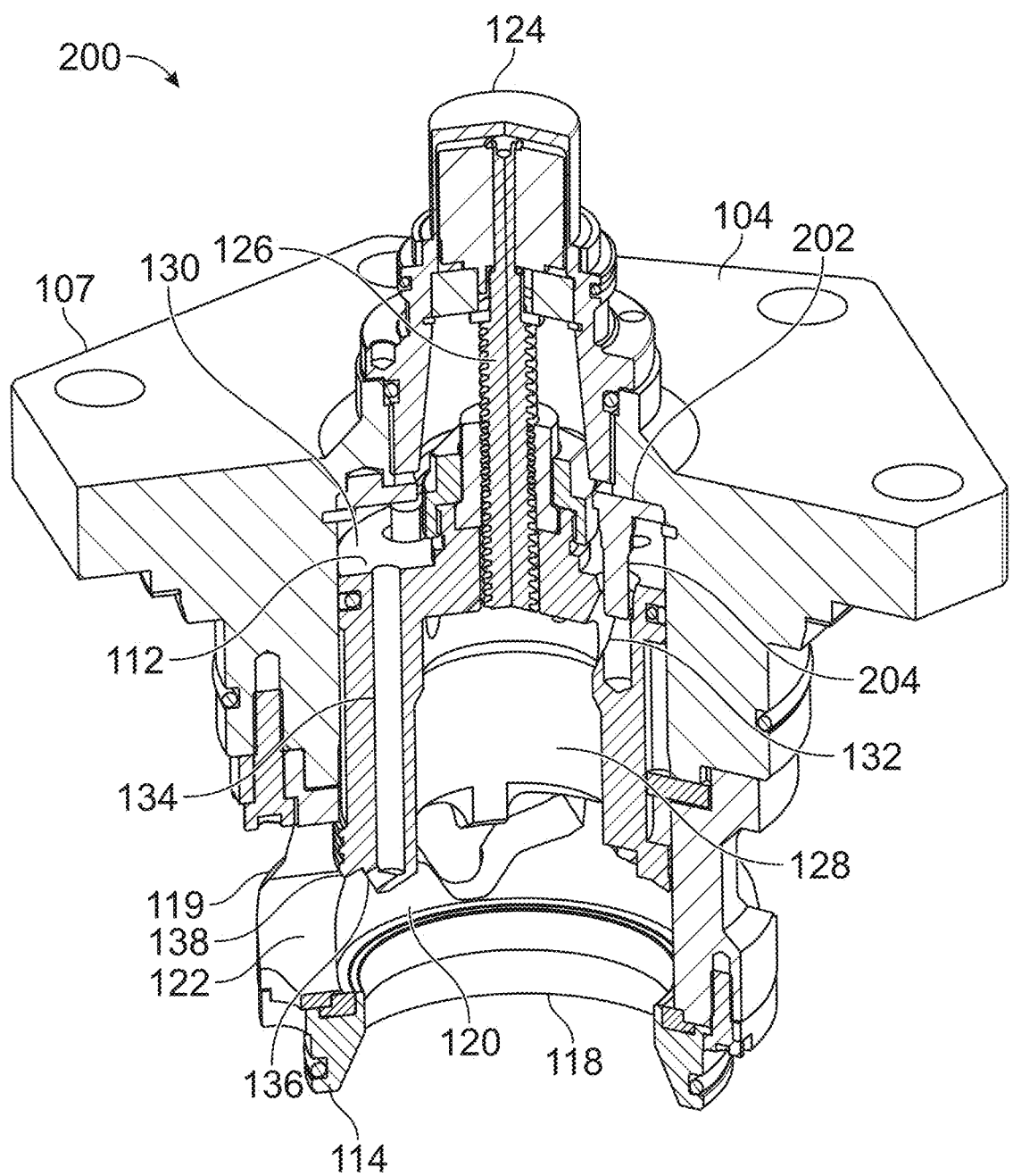
FIG. 5 illustrates a perspective partial cross-sectional view of the refrigerant control valve of FIG. 4, according to an example implementation.

FIG. 4 illustrates a cross-sectional elevational view of a refrigerant control valve 200, and FIG. 5 illustrates a perspective partial cross-sectional view of the refrigerant control valve 200, according to an example implementation. The refrigerant control valve 200 includes several of the same components of the refrigerant control valve 100, and such components are designated with the same reference numbers.

Referring to FIGS. 4-5 together, the refrigerant control valve 200 differs from the refrigerant control valve 100 in that the refrigerant control valve 200 has a restrictor plate 202 that has pins, such as pin 204, emanating or extending therefrom toward the modulating plug 112 and into the vent hole(s) 132. The pin 204 is used herein to indicate a particular pin or to refer collectively to the plurality of pins emanating from the restrictor plate 202.

As the pin 204 extends into the vent hole 132, an annular flow area is formed therebetween (i.e., between the exterior surface of the pin 204 and the interior surface bounding the vent hole 132). The annular flow area can be referred to as a clearance opening, for example. The linear position of the modulating plug 112 changes the size of such annular flow area.

Figure 6:
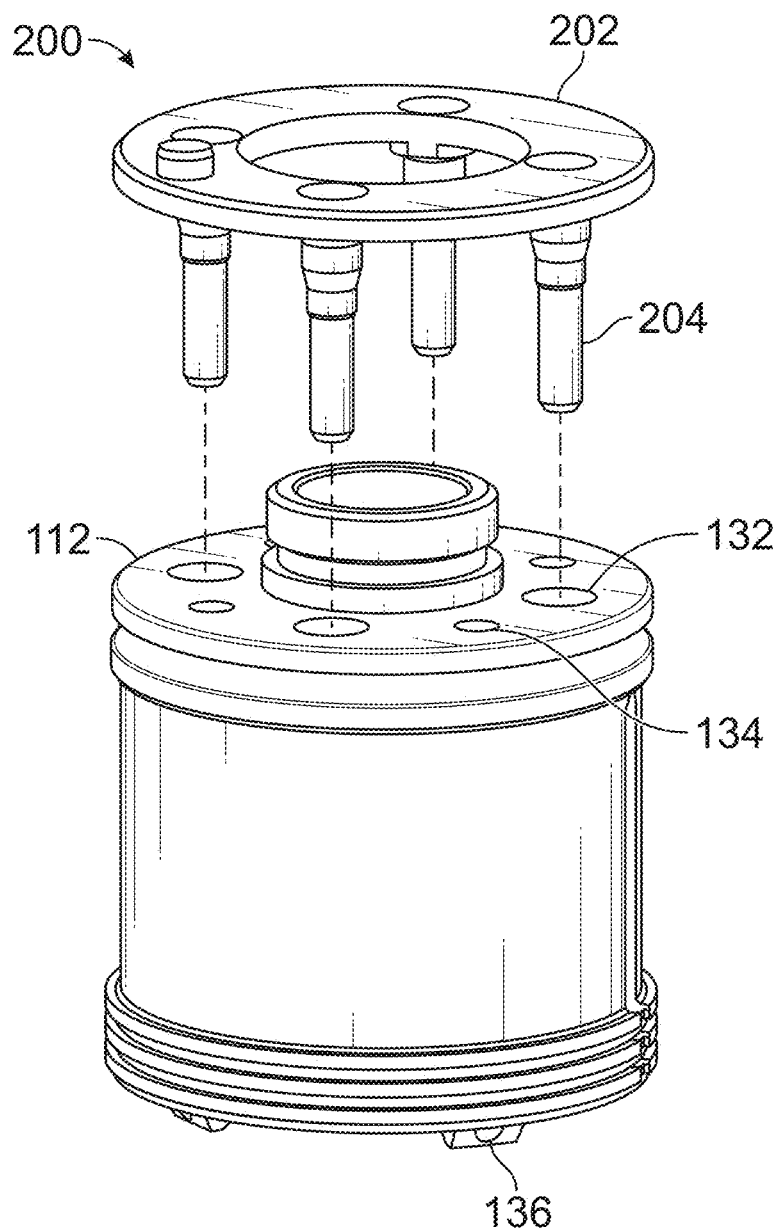
FIG. 6 illustrates a partial exploded perspective view of the refrigerant control valve of FIGS. 4-5, according to an example implementation.

FIG. 6 illustrates a partial exploded perspective view of the refrigerant control valve 200, according to an example implementation. Particularly, FIG. 6 illustrates the restrictor plate 202 from which the pin(s) 204 emanate downward to be inserted respectively into the vent hole(s) 132 of the modulating plug 112.

Referring to FIGS. 5-6 together, as the modulating plug 112 moves downward (by the actuator 124) away from the restrictor plate 202, the pin 204 has less or no effect on the annular flow area, and the annular flow area through the vent hole 132 may be maximized. Conversely, as the modulating plug 112 moves upward toward the restrictor plate 202, the pin 204 causes the annular flow area to decrease, thereby restricting refrigerant flow from the first chamber 128 to the second chamber 130 formed above the modulating plug 112.

Similar to the refrigerant control valve 100, due to the pressure differential, flow is induced through the vent hole(s) 132, around the pin(s) 204 into the second chamber 130 above the modulating plug 112, down the vent channel(s) 134, and out through the orifice(s) 136. However, as the modulating plug 112 moves upward by the actuator 124 to increase flow rate through the flow opening 122, the flow restriction between the pin(s) 204 and the vent hole(s) 132 increases. This increase in the flow restriction causes pressure level of refrigerant in the second chamber 130 to decrease, and thus causes the net refrigerant force on the modulating plug 112 to increase in the upward direction, assisting (or at least not opposing) the actuator 124 in moving the modulating plug 112 upward.

Conversely, as the modulating plug 112 moves downward to decrease flow rate through the flow opening 122, the flow restriction between the pin(s) 204 and the vent hole(s) 132 decreases. This decrease in the flow restriction causes pressure level of refrigerant in the second chamber 130 to increase, and thus causes the net refrigerant force on the modulating plug 112 to increase in the downward direction, assisting (or at least not opposing) the actuator 124 in moving the modulating plug 112 downward.

Thus, as the modulating plug 112 moves up or down, the flow restriction through the vent hole(s) 132 is varied. With this configuration, the magnitude of the net refrigerant force on the modulating plug 112 can be varied as the modulating plug 112 is stroked up and down.

Further, the magnitude of the net refrigerant force on the modulating plug 112 can be adjusted and minimized with the design and shape of the pin(s) 204. Although the pin(s) 204 shown in FIGS. 5-6 have a straight shape, other shapes can be used. For example, the pin(s) 204 can be configured to have a tapered shape.

Figure 7:
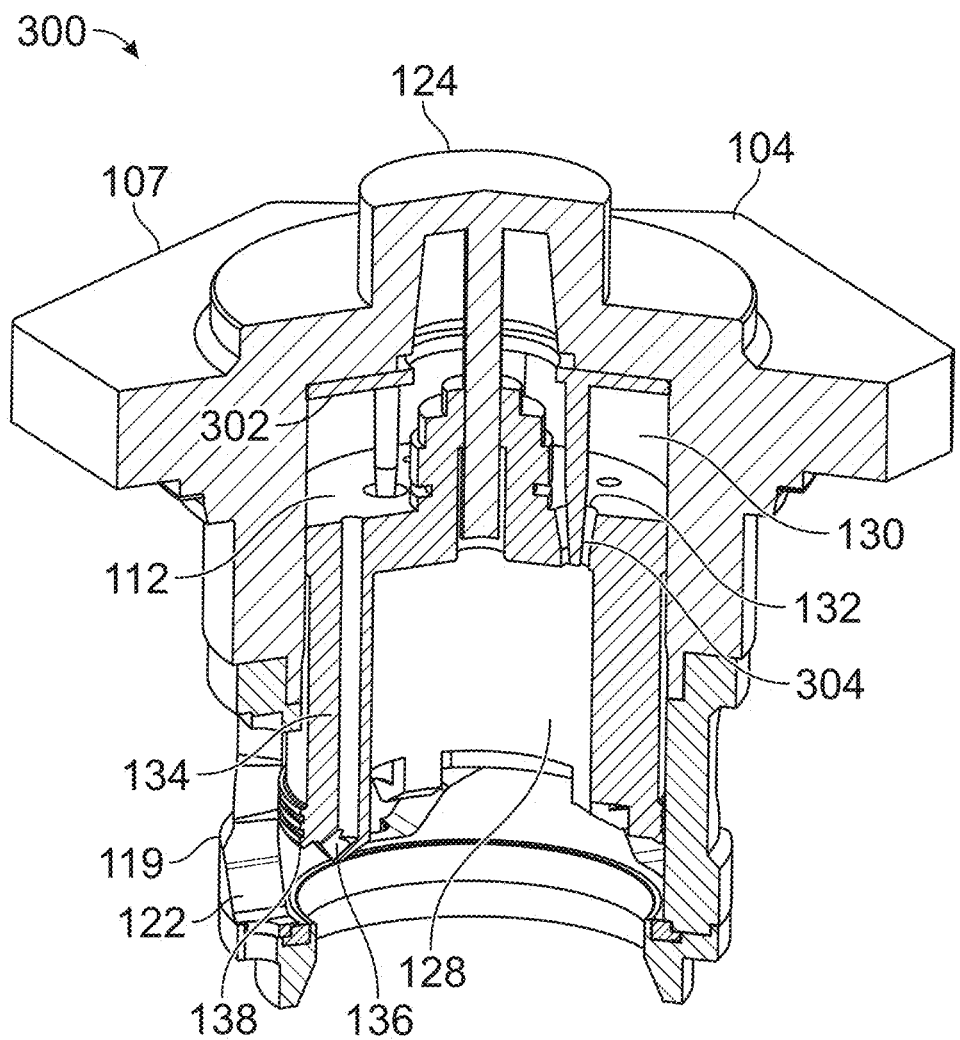
FIG. 7 illustrates a perspective partial cross-sectional view of a refrigerant control valve having a restrictor plate with tapered pins emanating therefrom, according to an example implementation.
Figure 8:
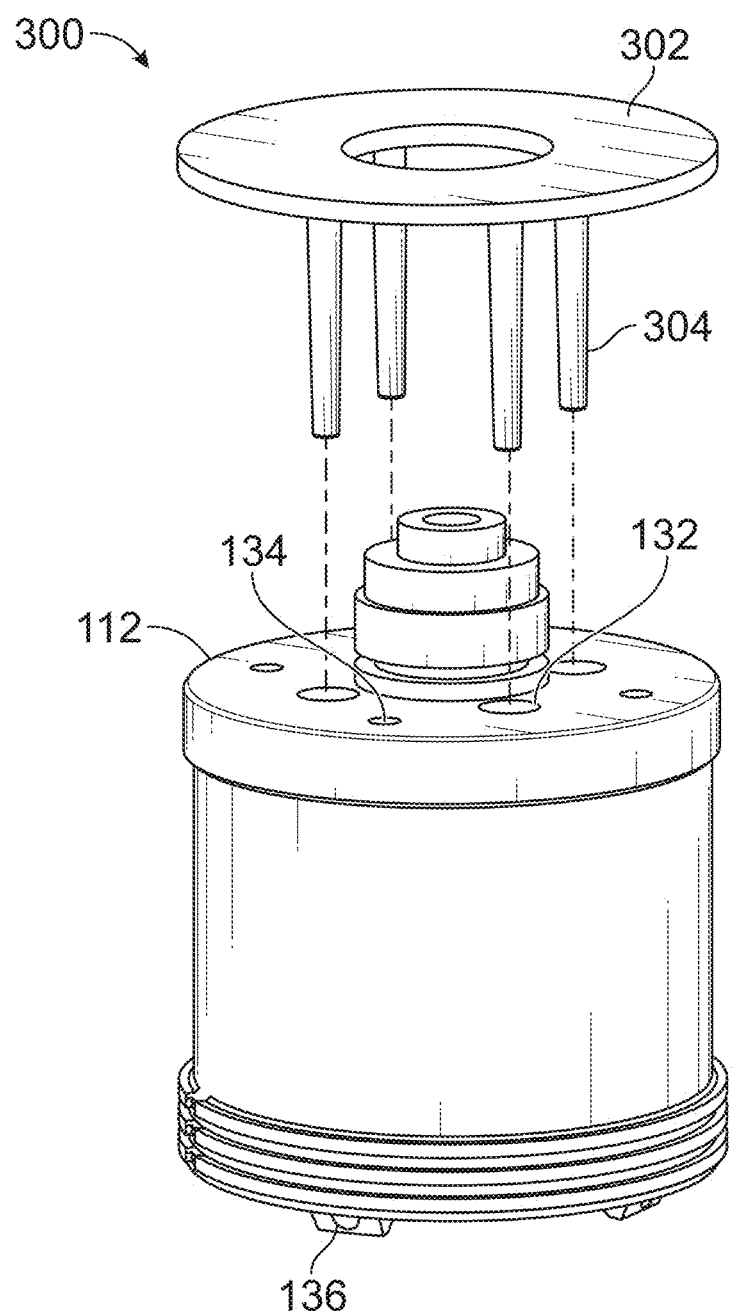
FIG. 8 illustrates a partial exploded perspective view of the refrigerant control valve of FIG. 7, according to an example implementation.

FIG. 7 illustrates a perspective partial cross-sectional view of a refrigerant control valve 300 having a restrictor plate 302 with tapered pins emanating therefrom, and FIG. 8 illustrates a partial exploded perspective view of the refrigerant control valve 300, according to an example implementation. The refrigerant control valve 300 is similar to the refrigerant control valve 200. However, the refrigerant control valve 300 has the restrictor plate 302 from which tapered pin(s) 304 (as opposed to straight pins) emanate downward toward the vent hole(s) 132, respectively. The conical shape of respective tips the tapered pin(s) 304 inserted into the vent hole(s) 132 can further tune the restriction flow area through the vent hole(s) 132 as the modulating plug 112 moves linearly to further enhance control and balance of the net refrigerant force on the modulating plug 112.

Other variations can be implemented.

Figure 9:
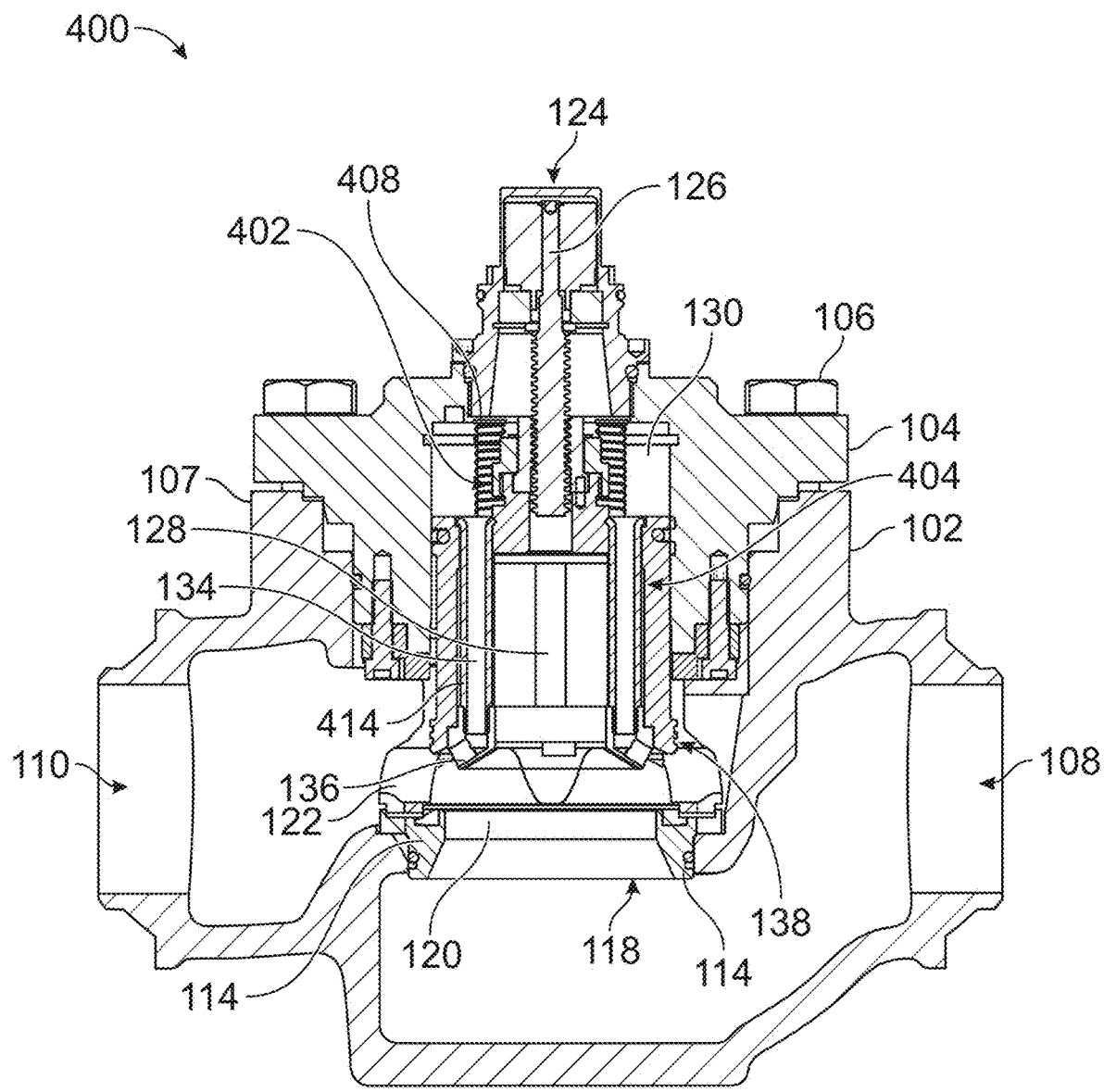
FIG. 9 illustrates a cross-sectional elevational view of a refrigerant control valve, according to an example implementation.
Figure 10:
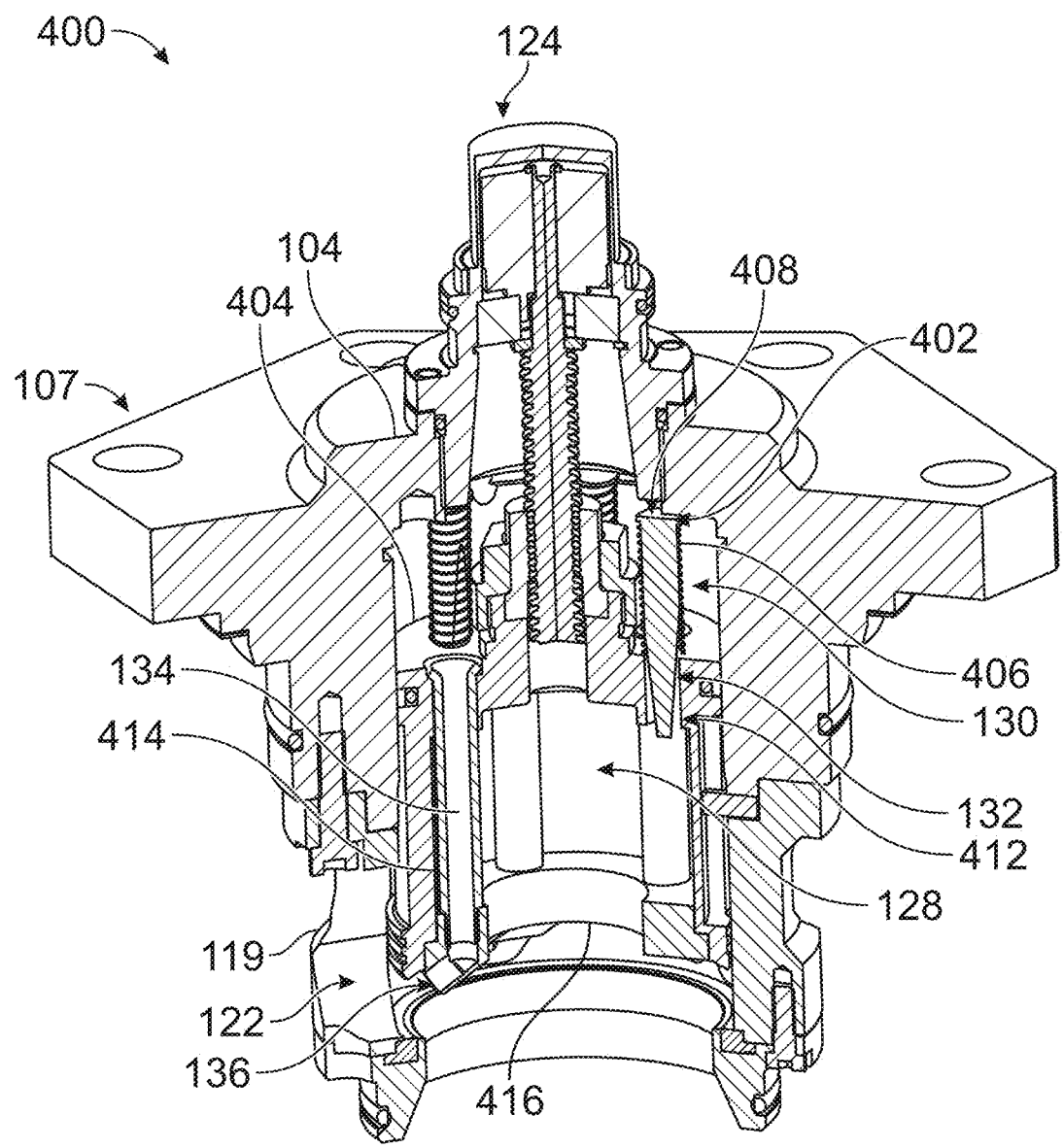
FIG. 10 illustrates a perspective partial cross-sectional view of the refrigerant control valve of FIG. 9, according to an example implementation.

FIG. 9 illustrates a cross-sectional elevational view of a refrigerant control valve 400, and FIG. 10 illustrates a perspective partial cross-sectional view of the refrigerant control valve 400, according to an example implementation. The refrigerant control valve 400 includes several of the same components of the refrigerant control valves 100, 200, 300, and such components are designated with the same reference numbers.

Referring to FIGS. 9-10 together, the refrigerant control valve 400 differs from the refrigerant control valves 200, 300 in that the refrigerant control valve 400 does not have a restrictor plate. Rather, the refrigerant control valve 400 has spring-loaded pins such as spring-loaded pin 402 integrated into or coupled to a modulating plug 404. The spring-loaded pin 402 is used herein to indicate a particular spring-loaded pin or to refer collectively to the plurality of spring-loaded pins of the refrigerant control valve 400.

FIG. 11 illustrates a perspective view of the modulating plug 404 and the spring-loaded pin(s) 402, and FIG. 12 illustrates a cross-sectional elevational view of the modulating plug 404 and the spring-loaded pin(s) 402, according to an example implementation. The spring-loaded pin(s) 402, can be held onto the modulating plug 404 by retaining rings such as retaining ring 405 (shown in FIG. 12) at the bottom of the spring-loaded pin(s) 402, for example.

Each of the spring-loaded pin(s) 402 can be held in an upward position by a spring 406 disposed around the spring-loaded pin 402. The spring 406 has a first end resting against the modulating plug 404, and a second end resting against a flange 408 (e.g., flattened top) formed at a top end of the spring-loaded pin 402. Thus, the spring 406 applies a biasing force on the spring-loaded pin 402 in the upward direction.

FIG. 13 illustrates a perspective view of the spring-loaded pin 402, in accordance with an example implementation. As depicted in FIG. 13, the lower section of the spring-loaded pin 402 has a groove 410 formed as a result of machining out or removal of material from the spring-loaded pin 402, for example. As shown, more material is removed toward the bottom end of the spring-loaded pin 402, and less material is removed progressively toward a top end of the groove 410. In other words, the groove 410 has a variable depth along a length of the spring-loaded pin 402.

Referring to FIGS. 12-13 together, due to the configuration of the groove 410, a flow area 412 that varies along a length of the spring-loaded pin 402 is formed through the vent hole 132 around the spring-loaded pin 402. The flow area 412 is also shown in FIG. 10.

Similar to refrigerant control valve 100, 200, 300, in the refrigerant control valve 400, due to the pressure differential between the first chamber 128 and the second chamber 130, refrigerant flow is induced through the flow area 412, around the spring-loaded pin(s) 402, into the second chamber 130 above the modulating plug 404, and then down through the vent channel(s) 134, and out through the orifice 136. This creates an intermediate pressure level in the second chamber 130 above the modulating plug 404, which is lower than the inlet pressure level at the first port 108, and higher than the outlet pressure level at the second port 110.

By adjusting the size of the flow area 412 machined into the spring-load pin(s) 402, the pressure level of fluid in the second chamber 130 acting on top of the modulating plug 404 can be adjusted to minimize the net refrigerant force acting on the modulating plug 404. Particularly, as the modulating plug 404 moves upward to increase the size of the flow opening 122, the flange 408 at the top of the spring-loaded pin 402 contacts the interior surface of the plate 104, causing the spring-loaded pin 402 to move downward relative to the modulating plug 404, compressing the spring 406. As the spring-loaded pin 402 moves downward into the modulating plug 404, the flow area 412 decreases due to the configuration of the groove 410 having variable depth along a length of the spring-loaded pin 402. The decrease in the flow area 412 causes an increase in flow restriction around the spring-loaded pin 402, thereby causing pressure level of refrigerant in the second chamber 130 at the top of the modulating plug 404 to decrease, and thus causes the net refrigerant force on the modulating plug 404 to increase in the upward direction.

Conversely, as the modulating plug 404 moves downward to decrease the size of the flow opening 122, the flow area 412 around the spring-loaded pin 402 increases (i.e., the flow restriction decreases). The increase in the flow area 412 causes pressure level of refrigerant in the second chamber 130 at the top of the modulating plug 404 to increase, and thus causes the net refrigerant force on the modulating plug 404 to increase in the downward direction.

With this configuration, as the modulating plug 404 moves up or down, there is a variable flow restriction at the vent hole(s) 132 formed through the modulating plug 404. This allows varying magnitudes of net force on the modulating plug 404 as the modulating plug 404 is stroked.

Additional variations can be implemented. For example, as illustrated in FIGS. 9-10, 12, the refrigerant control valve 400 has respective vent tubes such as vent tube 414 disposed in the vent channel(s) 134. Particularly, to reduce complexity and cost of machining the modulating plug 404, the vent tube(s) 414 can be made as a separate, tubular part that is then inserted through respective holes at the top of the modulating plug 404.

In an example, the vent tube(s) 414 connect to a mating part, that can be referred to as a manifold ring 416 shown in FIGS. 10, 12. The vent tube(s) 414 can be connected or coupled to the manifold ring 416 through a press fit or a threaded joint, as examples. Also, in one example, the top portion of the vent tube 414 is held in place by a swage form to lock the vent tube 414 in place. Notably, the manifold ring 416 also includes the orifice 136 formed therein.

The features of the refrigerant control valves 100, 200, 300, 400 can be used in combination with each other as appropriate. For example, the vent tube(s) 414 can be used in any of the refrigerant control valves 100, 200, 300. The pins of the refrigerant control valves 100, 200, 300 can also be spring loaded, and so on.

As mentioned above, the refrigerant control valves 100, 200, 300, 400 include the inner housing 119 that defines a longitudinal cavity in which the modulating plug 112, 404 is movable. The inner housing 119 also has one or more flow openings (e.g., cross-holes), such as the flow opening 122, that allow refrigerant flow from the main chamber 120 to the second port 110, as described above. The configuration of such flow openings may affect the forces acting on the modulating plug 112, 404.

Figure 14:
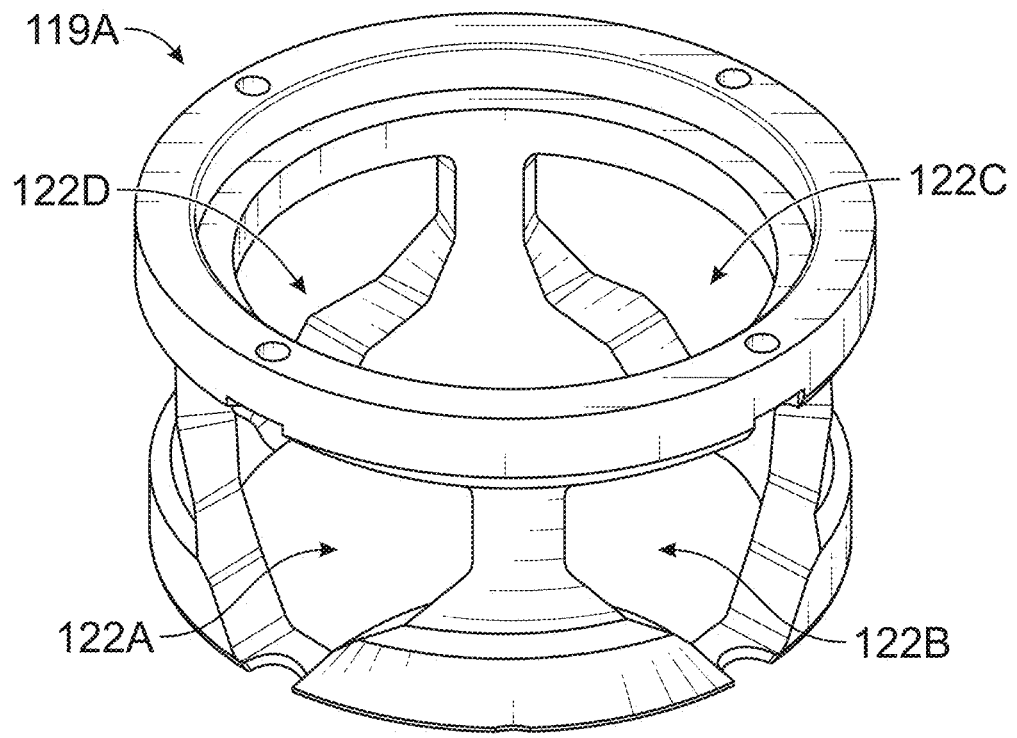
FIG. 14 illustrates a perspective view of an inner housing that has a plurality of flow openings disposed in a symmetric configuration, according to an example implementation.

FIG. 14 illustrates a perspective view of an inner housing 119A that has a plurality of flow openings disposed in a symmetric configuration, according to an example implementation. As shown, the inner housing 119A has four flow openings, flow opening 122A, flow opening 122B, flow opening 122C, and flow opening 122D disposed in a circular array in a symmetric configuration about a circumference of the inner housing 119A. More or fewer flow openings could be used, while maintaining such symmetry. For instance, only two flow openings could be used, one facing the second port 110 and one facing the opposite side.

Referring to FIGS. 2A, 14 together, for example, the inner housing 119A can be disposed within the valve body 102 such that the flow openings 122A, 122B face the second port 110, while the flow openings 122C, 122D face the opposite side (face the interior surface of the valve body 102). With this configuration, fluid can flow from the first port 108 through the chamber 120, into the inner housing 119A, then radially outward through all four flow openings 122A-122D. Fluid flowing through flow openings (e.g., the flow openings 122A, 122B) facing the second port 110 may have more space to flow freely to the second port 110.

On the other hand, fluid flowing through flow openings (e.g., the flow openings 122C, 122D) facing the interior surface of the valve body 102 may flow through tighter spaces. Particularly, fluid flowing out through the flow openings 122C, 122D may impinge on the interior surface of the valve body 102, then flow in an annular space around the inner housing 119A, and then flow to the second port 110.

With this configuration, fluid flowing through the flow openings 122C, 122D may apply a side load force on the modulating plug 112, 404. Particularly, such fluid may produce areas of higher pressure on one side (upstream side, not facing the second port 110) of the modulating plug 112, 404 compared to the other side facing the second port 110 (the downstream side). This might generate a net force pushing on the modulating plug 112, 404 toward the downstream side (to the left side in FIG. 2A). This may also cause higher friction forces to be applied on the modulating plug 112, 404 as it moves linearly up and down during operation. To alleviate such side loading and higher friction forces, it might be advantageous in some operating conditions to use an asymmetric inner housing with flow openings on only the side that faces the second port 110.

Figure 15:
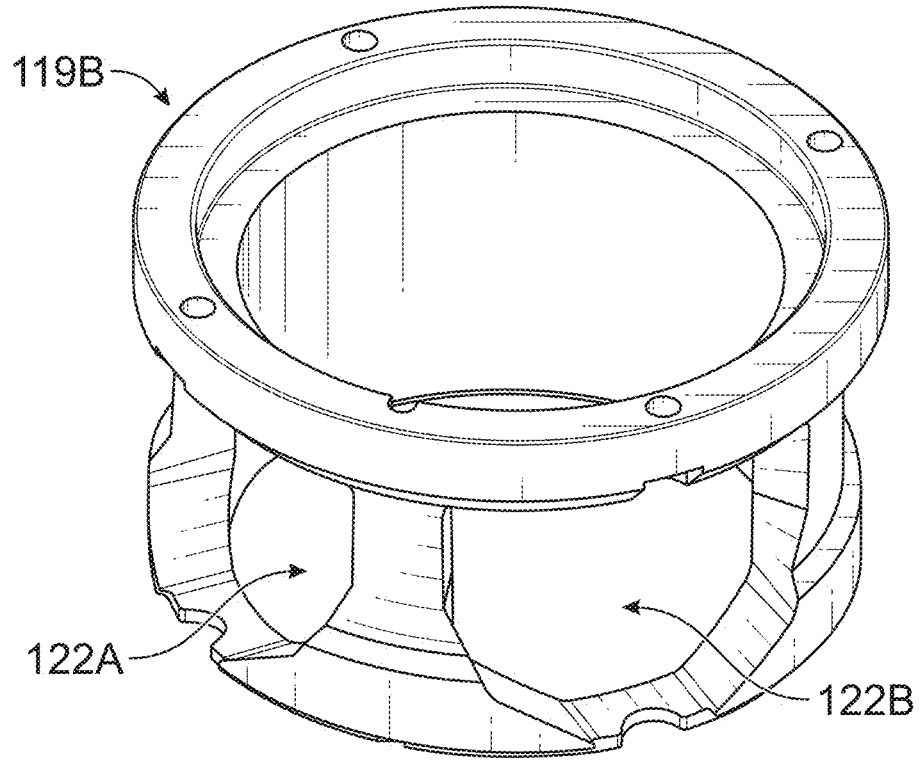
FIG. 15 illustrates a perspective view of an inner housing that has a plurality of flow openings disposed in an asymmetric configuration, according to an example implementation.

FIG. 15 illustrates a perspective view of an inner housing 119B that has a plurality of flow openings disposed in an asymmetric configuration, according to an example implementation. As shown, the inner housing 119B has only two flow openings, the flow opening 122A and the flow opening 122B, configured to face the second port 110. The inner housing 119B does not have the flow openings 122C, 122D. In examples, only one opening facing the second port 110 could be used.

Referring to FIGS. 2A, 15 together, fluid can flow from the first port 108 through the chamber 120, into the inner housing 119B, then radially outward through the flow openings 122A, 122B facing the second port 110. In contrast to the inner housing 119A, no fluid flows through the other side of the inner housing 119B facing the upstream side (facing the interior surface of the valve body 102).

With this configuration, a uniform pressure acts all around the outside surface of the modulating plug 112, 404. Thus, the side forces on the modulating plug 112, 404 may be reduced compared to the configuration with the inner housing 119A, thereby substantially reducing frictional forces applied to the modulating plug 112, 404 as it moves up and down.

Another way to reduce the side loading of the modulating plug 112, 404 while using the inner housing 119A may entail configuring the valve body 102 in a manner that increases the size of the annular space around the inner housing 119A (e.g., by removing more material from the interior of the valve body 102). This may provide a larger space for fluid flowing outward through the flow openings 122C, 122D to flow around the inner housing 119A toward the second port 110, potentially reducing areas of high pressure on the side of the modulating plug 112, 404 facing the interior surface of the valve body 102.

FIG. 16 is a flowchart of a method 500 of operating a refrigerant control valve, according to an example implementation. For example, the method 500 can be used to operate any of the refrigerant control valves 100, 200, 300, 400 described above.

The method 500 may include one or more operations, functions, or actions as illustrated by one or more of blocks 502-508. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 502, the method 500 includes receiving fluid at the first port 108 of the refrigerant control valve 100, 200, 300, 400, wherein the refrigerant control valve 100, 200, 300, 400 includes (i) the modulating plug 112, 404 that is linearly movable to control refrigerant flow rate from the first port 108 to the second port 110, (ii) the first chamber 128 formed at a first side of the modulating plug 112, 404 and fluidly coupled to the first port 108, and (iii) the second chamber 130 formed at a second side of the modulating plug 112, 404, opposite the first side.

At block 504, the method 500 includes flowing fluid from the first chamber 128 through a first flow restriction (e.g., the vent hole(s) 132) to the second chamber 130, thereby causing pressure level in the second chamber 130 to be lower than pressure level in the first chamber 128.

At block 506, the method 500 includes flowing fluid from the second chamber 130 through a second flow restriction (e.g., the vent channel(s) 134 and/or the orifice(s) 136) to the second port 110, thereby causing the pressure level in the second chamber 130 to be higher than pressure level at the second port 110.

At block 508, the method 500 includes applying a net fluid force to the modulating plug 112, 404 resulting from pressure applied by refrigerant in the first chamber 128 and refrigerant in the second chamber 130, wherein the pressure level in the second chamber 130 and the net fluid force are based on respective sizes of the first flow restriction and the second flow restriction.

The method 500 can further include any of the other steps or operations described throughout herein. For example, the method 500 can further including varying the size of the first flow restriction (e.g., varying the size of the vent hole(s) 132 via pins) as the modulating plug 112, 404 moves to change the net fluid force applied to the modulating plug 112, 404, as described above.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform actuators presented in the figures. In some instances, components of the devices and/or systems may be configured to perform the actuators such that the components are actually configured and structured (with hardware and/or software) to enable such performance. In other examples, components of the devices and/or systems may be arranged to be adapted to, capable of, or suited for performing the actuators, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiments (EEEs) listed below.

EEE 1 is a refrigerant control valve comprising: a modulating plug that is linearly movable to control refrigerant flow rate from a first port to a second port; a first chamber formed at a first side of the modulating plug, wherein the first chamber is fluidly coupled to the first port; a second chamber formed at a second side of the modulating plug, opposite the first side; a first flow restriction that fluidly couples the first chamber to the second chamber; and a second flow restriction that fluidly couples the second chamber to the second port, wherein refrigerant received at the first port flows to the first chamber, then through the first flow restriction to the second chamber, then through the second flow restriction to the second port, thereby creating an intermediate pressure level in the second chamber, which is lower than inlet pressure level at the first port and higher than outlet pressure level at the second port such that a net fluid force is applied to the modulating plug due to pressure applied by refrigerant in the first chamber and refrigerant in the second chamber, wherein the intermediate pressure level and the net fluid force are based on respective sizes of the first flow restriction and the second flow restriction.

EEE 2 is the refrigerant control valve of EEE 1, wherein the first flow restriction includes one or more vent holes formed in the modulating plug, wherein refrigerant received at the first port flows to the first chamber, then through the one or more vent holes to the second chamber, thereby causing pressure to decrease from the first port to the second chamber.

EEE 3 is the refrigerant control valve of EEE 2, further comprising: a restrictor plate; and one or more pins emanating from the restrictor plate toward the one or more vent holes to be inserted therethrough, such that an annular flow area is formed between each of the one or more pins and a respective vent hole of the one or more vent holes, wherein as the modulating plug moves linearly, a respective size of the annular flow area and the first flow restriction varies, thereby varying the intermediate pressure level in the second chamber and the net fluid force applied to the modulating plug.

EEE 4 is the refrigerant control valve of EEE 3, wherein the one or more pins are tapered pins.

EEE 5 is the refrigerant control valve of any of EEEs 2-4, further comprising: one or more spring-loaded pins inserted through the one or more vent holes respectively and retained to the modulating plug, wherein a flow area is formed between each of the one or more spring-loaded pins and a respective vent hole of the one or more vent holes, wherein as the modulating plug moves linearly, a respective size of the flow area and the first flow restriction varies, thereby varying the intermediate pressure level in the second chamber and the net fluid force applied to the modulating plug.

EEE 6 is the refrigerant control valve of EEE 5, wherein each of the spring-loaded pins is biased by a spring having a first end resting against the modulating plug and a second end resting against a flange formed in a respective spring-loaded pin.

EEE 7 is the refrigerant control valve of any of EEEs 5-6, wherein each of the spring-loaded pins includes a groove having a variable depth along a length of a respective spring-loaded pin, thereby causing the respective size of the flow area and the first flow restriction to vary as the modulating plug moves linearly.

EEE 8 is the refrigerant control valve of any of EEEs 1-7, wherein the second flow restriction includes one or more vent channels formed in the modulating plug.

EEE 9 is the refrigerant control valve of EEE 8, wherein the second flow restriction further includes one or more orifices that fluidly couple the one or more vent channels to the second port.

EEE 10 is the refrigerant control valve of EEE 9, wherein the one or more orifices are formed in the modulating plug.

EEE 11 is the refrigerant control valve of any of EEEs 8-10, further comprising: one or more vent tubes respectively inserted into the one or more vent channels.

EEE 12 is the refrigerant control valve of EEE 11, further comprising: a manifold ring coupled to the one or more vent tubes.

EEE 13 is the refrigerant control valve of EEE 12, wherein the second flow restriction further includes one or more orifices that fluidly couple the one or more vent channels to the second port, and wherein the one or more orifices are formed in the manifold ring.

EEE 14 is the refrigerant control valve of any of EEEs 1-13, wherein the first flow restriction is formed, at least partially, in the modulating plug.

EEE 15 is the refrigerant control valve of any of EEEs 1-14, wherein the second flow restriction is formed, at least partially, in the modulating plug.

EEE 16 is the refrigerant control valve of any of EEEs 1-15, further comprising: a valve body; and a plate coupled to the valve body such that the valve body and the plate form a cavity in which the modulating plug is movable.

EEE 17 is the refrigerant control valve of EEE 16, further comprising: an inner housing disposed within the valve body and coupled to the plate such that the inner housing and the plate define the cavity in which the modulating plug is movable.

EEE 18 is the refrigerant control valve of EEE 17, wherein the inner housing includes one or more flow openings that allow refrigerant flow to the second port, wherein the one or more flow openings are disposed in an asymmetric configuration such that the one or more flow openings face the second port only.

EEE 19 is a method of operating the refrigerant control valve of any of EEEs 1-18. For example, the method comprises: receiving fluid at a first port of a refrigerant control valve, wherein the refrigerant control valve includes (i) a modulating plug that is linearly movable to control refrigerant flow rate from the first port to a second port, (ii) a first chamber formed at a first side of the modulating plug and fluidly coupled to the first port, and (iii) a second chamber formed at a second side of the modulating plug, opposite the first side; flowing fluid from the first chamber through a first flow restriction to the second chamber, thereby causing pressure level in the second chamber to be lower than pressure level in the first chamber; flowing fluid from the second chamber through a second flow restriction to the second port, thereby causing the pressure level in the second chamber to be higher than pressure level at the second port; and applying a net fluid force to the modulating plug resulting from pressure applied by refrigerant in the first chamber and refrigerant in the second chamber, wherein the pressure level in the second chamber and the net fluid force are based on respective sizes of the first flow restriction and the second flow restriction.

EEE 20 is the method of EEE 19, further comprising: varying a respective size of the first flow restriction as the modulating plug moves, thereby changing the net fluid force applied to the modulating plug.

What is claimed is:

1. A refrigerant control valve comprising:
    a modulating plug that is linearly movable to control refrigerant flow rate from a first port to a second port;
    a first chamber formed at a first side of the modulating plug, wherein the first chamber is fluidly coupled to the first port;
    a second chamber formed at a second side of the modulating plug, opposite the first side;
    a first flow restriction that fluidly couples the first chamber to the second chamber; and
    a second flow restriction that fluidly couples the second chamber to the second port, wherein refrigerant received at the first port flows to the first chamber, then through the first flow restriction to the second chamber, then through the second flow restriction to the second port, thereby creating an intermediate pressure level in the second chamber, which is lower than inlet pressure level at the first port and higher than outlet pressure level at the second port such that a net fluid force is applied to the modulating plug due to pressure applied by refrigerant in the first chamber and refrigerant in the second chamber, wherein the intermediate pressure level and the net fluid force are based on respective sizes of the first flow restriction and the second flow restriction.

2. The refrigerant control valve of claim 1, wherein the first flow restriction includes one or more vent holes formed in the modulating plug, wherein refrigerant received at the first port flows to the first chamber, then through the one or more vent holes to the second chamber, thereby causing pressure to decrease from the first port to the second chamber.

3. The refrigerant control valve of claim 2, further comprising:
    a restrictor plate; and
    one or more pins emanating from the restrictor plate toward the one or more vent holes to be inserted therethrough, such that an annular flow area is formed between each of the one or more pins and a respective vent hole of the one or more vent holes, wherein as the modulating plug moves linearly, a respective size of the annular flow area and the first flow restriction varies, thereby varying the intermediate pressure level in the second chamber and the net fluid force applied to the modulating plug.

4. The refrigerant control valve of claim 3, wherein the one or more pins are tapered pins.

5. The refrigerant control valve of claim 2, further comprising:
    one or more spring-loaded pins inserted through the one or more vent holes respectively and retained to the modulating plug, wherein a flow area is formed between each of the one or more spring-loaded pins and a respective vent hole of the one or more vent holes, wherein as the modulating plug moves linearly, a respective size of the flow area and the first flow restriction varies, thereby varying the intermediate pressure level in the second chamber and the net fluid force applied to the modulating plug.

6. The refrigerant control valve of claim 5, wherein each of the spring-loaded pins is biased by a spring having a first end resting against the modulating plug and a second end resting against a flange formed in a respective spring-loaded pin.

7. The refrigerant control valve of claim 5, wherein each of the spring-loaded pins includes a groove having a variable depth along a length of a respective spring-loaded pin, thereby causing the respective size of the flow area and the first flow restriction to vary as the modulating plug moves linearly.

8. The refrigerant control valve of claim 1, wherein the second flow restriction includes one or more vent channels formed in the modulating plug.

9. The refrigerant control valve of claim 8, wherein the second flow restriction further includes one or more orifices that fluidly couple the one or more vent channels to the second port.

10. The refrigerant control valve of claim 9, wherein the one or more orifices are formed in the modulating plug.

11. The refrigerant control valve of claim 8, further comprising:
    one or more vent tubes respectively inserted into the one or more vent channels.

12. The refrigerant control valve of claim 11, further comprising:
    a manifold ring coupled to the one or more vent tubes.

13. The refrigerant control valve of claim 12, wherein the second flow restriction further includes one or more orifices that fluidly couple the one or more vent channels to the second port, and wherein the one or more orifices are formed in the manifold ring.

14. The refrigerant control valve of claim 1, wherein the first flow restriction is formed, at least partially, in the modulating plug.

15. The refrigerant control valve of claim 1, wherein the second flow restriction is formed, at least partially, in the modulating plug.

16. The refrigerant control valve of claim 1, further comprising:
    a valve body; and
    a plate coupled to the valve body such that the valve body and the plate form a cavity in which the modulating plug is movable.

17. The refrigerant control valve of claim 16, further comprising:
    an inner housing disposed within the valve body and coupled to the plate such that the inner housing and the plate define the cavity in which the modulating plug is movable.

18. The refrigerant control valve of claim 17, wherein the inner housing includes one or more flow openings that allow refrigerant flow to the second port, wherein the one or more flow openings are disposed in an asymmetric configuration such that the one or more flow openings face the second port only.

19. A method comprising:
    receiving fluid at a first port of a refrigerant control valve, wherein the refrigerant control valve includes (i) a modulating plug that is linearly movable to control refrigerant flow rate from the first port to a second port, (ii) a first chamber formed at a first side of the modulating plug and fluidly coupled to the first port, and (iii) a second chamber formed at a second side of the modulating plug, opposite the first side;

flowing fluid from the first chamber through a first flow restriction to the second chamber, thereby causing pressure level in the second chamber to be lower than pressure level in the first chamber;

flowing fluid from the second chamber through a second flow restriction to the second port, thereby causing the pressure level in the second chamber to be higher than pressure level at the second port; and applying a net fluid force to the modulating plug resulting from pressure applied by refrigerant in the first chamber and refrigerant in the second chamber, wherein the pressure level in the second chamber and the net fluid force are based on respective sizes of the first flow restriction and the second flow restriction.

20. The method of claim 19, further comprising:

varying a respective size of the first flow restriction as the modulating plug moves, thereby changing the net fluid force applied to the modulating plug.

\* \* \* \* \*